(12) United States Patent
Giefer et al.

(10) Patent No.: US 6,997,850 B2
(45) Date of Patent: Feb. 14, 2006

(54) SHIFTING DEVICE FOR AN AUTOMATIC TRANSMISSION OF A MOTOR VEHICLE WITH A LOCKING DEVICE FOR THE SELECTOR DEVICE

(75) Inventors: Andreas Giefer, Lemförde (DE); Jörg Meyer, Wagenfeld (DE); Dietmar Otto, Dresden (DE)

(73) Assignee: ZF Lemförder Metallwaren AG, Dielinfen (DE)

( * ) Notice: Subject to any disclaimer, the term of this patent is extended or adjusted under 35 U.S.C. 154(b) by 29 days.

(21) Appl. No.: 10/780,994

(22) Filed: Feb. 18, 2004

(65) Prior Publication Data

US 2004/0162185 A1 Aug. 19, 2004

(30) Foreign Application Priority Data

Feb. 19, 2003 (DE) ................................ 103 07 109

(51) Int. Cl.
*F16H 59/74* (2006.01)

(52) U.S. Cl. ........................................................ 477/99
(58) Field of Classification Search .................. 477/99; 74/473.21, 473.23, 473.24, 473.25
See application file for complete search history.

(56) References Cited

U.S. PATENT DOCUMENTS

| 5,207,124 A | * | 5/1993 | Anderson et al. ............. 477/99 |
| 6,547,696 B1 | * | 4/2003 | Syamoto et al. .............. 477/99 |
| 6,852,065 B1 | * | 2/2005 | Yamada et al. ............... 477/99 |

* cited by examiner

*Primary Examiner*—Dirk Wright
(74) *Attorney, Agent, or Firm*—McGlew & Tuttle, P.C.

(57) ABSTRACT

A shifting device (1) is provided for transmitting shift commands to an automatic transmission of a motor vehicle, with a housing (2) and/or a frame, a selector lever (4), which transmits shift commands to the transmission of the motor vehicle and can be moved at least in an automatic gate and preferably also in a Tiptronic gate. The selector lever (4) can be fixed in a parking position P by an axially displaceable locking bar (5) that can be actuated manually, and with a locking device, which is coupled with the ignition lock and prevents the unlocking of the selector lever (4) from the parking position when the ignition key has been removed and the removal of the ignition key when the selector lever (4) is outside the parking position. The locking device is formed by a stopper (8), which is displaceable in the direction of the automatic gate and through which the selector lever (4) passes, and a locking lever (9), which acts on the stopper (8). A coupling is provided between the locking bar (5) and the locking lever (9).

25 Claims, 10 Drawing Sheets

SHIFTING DEVICE FOR AN AUTOMATIC TRANSMISSION OF A MOTOR VEHICLE WITH A LOCKING DEVICE FOR THE SELECTOR DEVICE

CROSS REFERENCE TO RELATED APPLICATIONS

This application claims the benefit of priority under 35 U.S.C. §119 of German patent application DE 103 07 109 filed Feb. 19, 2003, the entire contents of which are incorporated herein by reference.

FIELD OF THE INVENTION

The present invention pertains to a shifting device for transmitting shift commands to an automatic transmission of a motor vehicle with a housing and/or a frame, a selector lever, which transmits shift commands to the transmission of the motor vehicle and is movable at least in an automatic gate and preferably also in a Tiptronic gate, wherein the selector lever can be fixed in a parking position P by an axially displaceable locking bar, which can be actuated manually, and with a locking device, which is coupled with the ignition lock and prevents the unlocking of the selector lever from the parking position with the ignition key removed and prevents the ignition key from being removed when the selector lever is outside the parking position.

BACKGROUND OF THE INVENTION

Shifting devices for transmitting shaft commands to the transmission of a motor vehicle, in which the movement of the selector lever can be blocked by a device, are generally known.

Thus, the selector lever of an automatic transmission is frequently provided in these prior-art shifting devices with a locking device, which permits shiftings into another position only after a pushbutton has been depressed in the shift knob. A locking bar is guided here mainly in the interior of the gearshift lever. It is actuated by the pushbutton and engages a shifting gate with a corresponding locking contour. For example, shifting from the shift position P (park) into the shift position R (reverse) and from R to P and N (neutral) after R may be possible only after depressing the pushbutton. One US standard requires a so-called keylock system. According to this standard, two requirements must be met. On the one hand, the selector lever cannot be shifted out of the shift position P with the ignition key removed, and, on the other hand, the ignition key must not be removed when the selector lever is not in the shift position P.

To meet these requirements, the locking mechanism is frequently connected to the ignition lock via a bowden cable. The bowden cable is coupled with the locking mechanism via a mechanism. If the ignition is not turned on, the bowden cable is blocked by the ignition lock, and the locking mechanism is thus in its blocked position as well. Shifting out of P is prevented. If the ignition is turned on and the selector lever is shifted out of position P, the locking bar and the mechanism pull on the bowden cable, as a result of which a mechanism in the ignition lock ensures that the ignition key cannot be removed. The bowden cable is pulled into its blocking end position in the ignition lock either only by depressing the pushbutton in the shift knob or, on the one hand, by depressing the pushbutton and, on the other hand, by a shifting movement of the selector lever during the shifting out of P. However, the bowden cable must have reached its end position in position R at the latest. It must thereafter be ensured that the bowden cable always remains in the pulled position outside position P. This is usually achieved in two different ways.

According to one solution, a locking lever is mounted in the shifting mechanism. This locking lever has two lever arms. One arm of the lever, also called a locking arm, is in contact with a corresponding opposite contour of the locking bar, while the other arm, called mostly the pulling arm, is connected with the bowden cable. If the bowden cable is now blocked, the locking bar cannot move the locking lever, and the selector lever is thus blocked as well. If the ignition is now turned on and the bowden cable is released, the locking bar is moved by depressing the pushbutton in the knob, and the locking bar will in turn move the locking lever, so that the bowden cable is pulled. To keep the locking lever and consequently the bowden cable in this position, the locking arm has an extension, or the locking lever has an additional arm, whose contour ensures by means of a corresponding opposite contour at the selector lever that the locking lever remains outside P in all shift positions in the pulled position of the bowden cable.

The second prior-art possibility of ensuring that the bowden cable always remains in the pulled position outside the position P is embodied with a locking lever that functions as described above. However, this locking lever has no extension with a corresponding opposite contour at the selector lever. The locking lever is held in the pulled position of the bowden cable by means of a spring-loaded support lever, which pivots automatically into the holding position and is pushed away by the selector lever when the selector lever is pivoted back into position P.

The drawback to the first solution is that a locking lever with an extension and with a corresponding opposite contour frequently cannot be accommodated at the selector lever for kinematic reasons or because of the limited space available. Another problem can be seen in an automatic transmission with an additional manual shift gate (Tiptronic transmission). The selector lever is moved here from position D into a second, parallel gate. The opposite contour at the selector lever must extend now not only in the direction of the automatic gate, but it must also be extended at right angles thereto. This represents an additional problem in terms of the space available.

One drawback to the second solution is that it cannot be ensured that the support lever will indeed also pivot into the holding position, because the pivoting into the holding position is brought about only by the pretension of the spring rather than by a restricted guidance.

SUMMARY OF THE INVENTION

The object of the present invention is therefore to provide a shifting device for an automatic transmission of a motor vehicle with a locking device for the selector lever, in which the locking device requires a substantially smaller space for installation in the shifting device, the locking of the selector lever functions more reliably, and the shifting comfort of the shifting device is at the same time improved.

This object of the present invention is accomplished with a shifting device having for transmitting shift commands to an automatic transmission of a motor vehicle, with a housing and/or a frame. A selector lever is provided which transmits the shift commands to the transmission of the motor vehicle and can be moved at least in one automatic gate and preferably also in a Tiptronic gate, wherein the selector lever can be fixed in a parking position P by a axially displaceable locking bar that can be actuated manually. A locking device is provided, which is coupled with the ignition lock and prevents the unlocking of the selector lever from the parking position when the ignition key has been removed and prevents the removal of the ignition key when the selector lever is outside the parking position. The locking device is formed by a stopper, which is displaceable in the direction of the automatic gate and through which the selector lever passes, and by a locking lever acting on the stopper, wherein a coupling is provided between the locking bar and the locking lever.

The inventors have recognized that the locking device can be made considerably more compact by using such a special locking lever between the locking bar and the bowden cable. However, this locking lever is not held, as before, by a contour at the selector lever or by a support lever outside the shift position P in the pulled position of the bowden cable, but the holding function of this locking lever is brought about by means of a stopper, which is guided linearly in the housing and is carried by the selector lever. This stopper may have at least one guideway, on which lies a small extension arm of the locking lever outside position P and the locking lever is thus held. The guideway is released in position P, so that the locking lever can plunge through here during the actuation of the pushbutton in the knob and consequently during the movement of the locking bar and the locking lever extension arm. The beginning of the guideway may be provided with an oblique ramp, so that when the pushbutton is depressed, the locking lever is moved to a certain extent only, while the rest of the movement takes place during the shifting out of position P over the ramp. In a Tiptronic transmission, the selector lever can be moved out of the carrying range of the locking lever during pivoting into the manual gate, so that no friction effects can be felt during tipping in the manual gate. The stopper remains in position D.

The inventors accordingly suggest that the prior-art shifting device for transmitting shift commands to an automatic transmission of a motor vehicle, with a housing and/or a frame, with a selector lever, which transmits shift commands to the transmission of the motor vehicle and can be moved at least in one automatic gate and preferably also in a Tiptronic gate, wherein the selector lever can be fixed in a parking position P by an axially displaceable locking bar which can be actuated manually, and with a locking device, which is coupled with the ignition lock and prevents the unlocking of the selector lever from the parking position when the ignition key has been removed and prevents the ignition key from being removed when the selector lever is outside the parking position, be improved such that the locking device is formed from a stopper, which is displaceable in the direction of the automatic gate and through which the selector lever passes, and a locking lever acting on the stopper, wherein a coupling is provided between the locking bar and the locking lever.

The locking device can be made very compact due to this special combination of a stopper and a locking lever adapted thereto. It is no longer necessary to move the locking lever into the desired position by means of complicated contours in the housing of the shifting device or by means of guide contours at the selector lever. The stopper, which preferably performs a linear movement in the housing of the shifting device, thus hinders the movement of the selector lever during the changeover between the individual gears considerably less than does a contour guide. As a result, the shifting comfort of the selector lever is further increased in such a shifting device.

An especially advantageous embodiment of the locking device is obtained when the stopper and the selector lever each have a contour that couples the stopper with the movement of the selector lever only in the automatic gate. Thus, the stopper may have an inner contour that is designed to extend in the direction of movement of the selector lever such that the stopper is in contact with the selector lever. If the selector lever is pivoted, for instance, into a lateral manual shift gate (Tiptronic gate), the inner contour of the stopper may have openings, so that the selector lever is no longer in contact with the stopper.

However, the contour of the locking lever may also have a special design. Thus, the locking may have a fork-shaped design. The tines of the fork-shaped locking lever may be led around the stopper lever in an especially space-saving manner. The contour of the locking lever should also be adapted to the contour of the stopper. The locking lever should be able to pass through the stopper in the shift position P, and the locking lever should then be held by the stopper in a position blocking the ignition lock in other shift positions.

It is also favorable for the coupling between the locking bar and the locking lever to be formed by a cross pin, which acts on the locking lever. This cross pin may be led through a hole in the selector lever and may be fastened in a hole of the locking bar. On the one hand, the locking lever is carried by the locking pin upward when the locking bar, which is to bring about the movement of the selector lever out of the shift position P (Park), is pressed. As a result, the locking lever can be moved into a locked position, in which the ignition lock prevents the ignition key from being removed. On the other hand, this cross pin makes it possible that the locking lever, which is arranged above the cross pin, cannot be moved in the shift position Park when the ignition key is removed.

In a comfortable embodiment of the shifting device, guide rails are arranged in the housing for the linear guiding of the stopper. The stopper can be moved in these guide rails by means of mounted rollers. As a result, frictional forces are minimized during the movement of the stopper to the extent possible, and the forces for moving the selector lever are thus reduced.

The stopper may have at least one ramp for at least one extension arm of the locking lever. The extension arm of the locking lever can be guided by this ramp out of the guideway of the stopper without a jerk when the selector lever is moved out of the shift position P, which supports the raising of the stopper.

It is especially advantageous for the extension arm of the locking lever to have a roller in the area of contact with the stopper. As a result, the forces acting on the selector lever can be reduced when the locking lever is rolling up on the ramp of the stopper. In addition, the roller guarantees a harmonic movement of the locking lever on the guideway of the stopper during the relative movement between the stopper and the locking lever.

The locking level should be held by the stopper outside the shift position P. However, since the stopper is carried by the selector lever in the automatic gate, friction may occur in the contact area between the locking lever and the stopper. To minimize the frictional forces during the movement of the selector lever, it is favorable for the stopper to have at least one guideway. A relative movement between the stopper and the "locking" locking lever can be made possible on this guideway, which may have, for example, a teflon coating and/or mounted roller elements.

An inexpensive embodiment of the coupling between the ignition lock and the locking lever can be embodied by a bowden cable. This bowden cable guarantees a reliable, mechanically coupled connection between the position of the ignition key in the ignition lock and the position of the locking lever.

Other features and advantages of the present invention appear from the following description of preferred exemplary embodiments with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
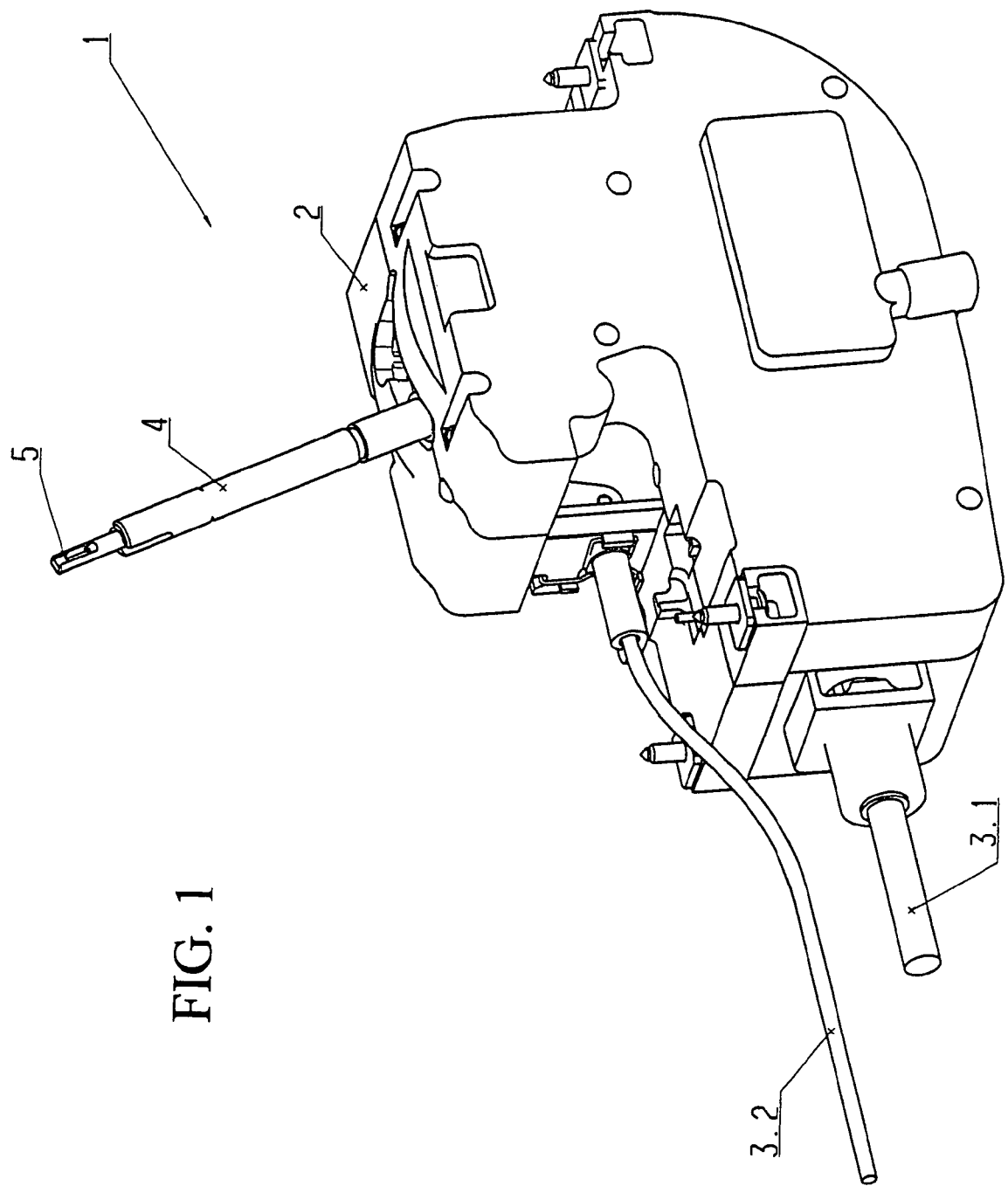
FIG. 1 is a perspective view of a shifting device for a motor vehicle transmission with a closed housing and with a locking device for the selector lever.

Referring to the drawings in particular, FIG. 1 shows a perspective view of a shifting device 1 with a closed housing 2 for a motor vehicle transmission. This special shifting device 1 has a locking device for the selector lever 4. The mechanism of the locking device is located in the interior of the housing 2 and is not visible in FIG. 1. In addition to the bowden cable 3.1, via which the shift positions are transmitted from the selector lever 4 to the motor vehicle transmission, an additional bowden cable 3.2 is present. The bowden cable 3.2 establishes a connection between the selector lever 4 and the ignition lock and is coupled with the locking mechanism via the mechanism. If the ignition of the motor vehicle is not turned on, i.e., the ignition key is, e.g., removed, the bowden cable 3.2 is blocked by the ignition lock, and the locking mechanism is thus in its blocked position as well. The selector lever 4 is prevented from being shifted out of the shift position P. If the ignition of the motor vehicle is turned on, i.e., the ignition key is turned, and the selector lever 4 shifted out of the shift position P, the bowden cable 3.2 is pulled by the locking bar 5, which is guided within the selector lever 4, and by the mechanism, as a result of which a mechanism in the ignition lock will in turn ensure that the ignition key cannot be removed.

Figure 2:
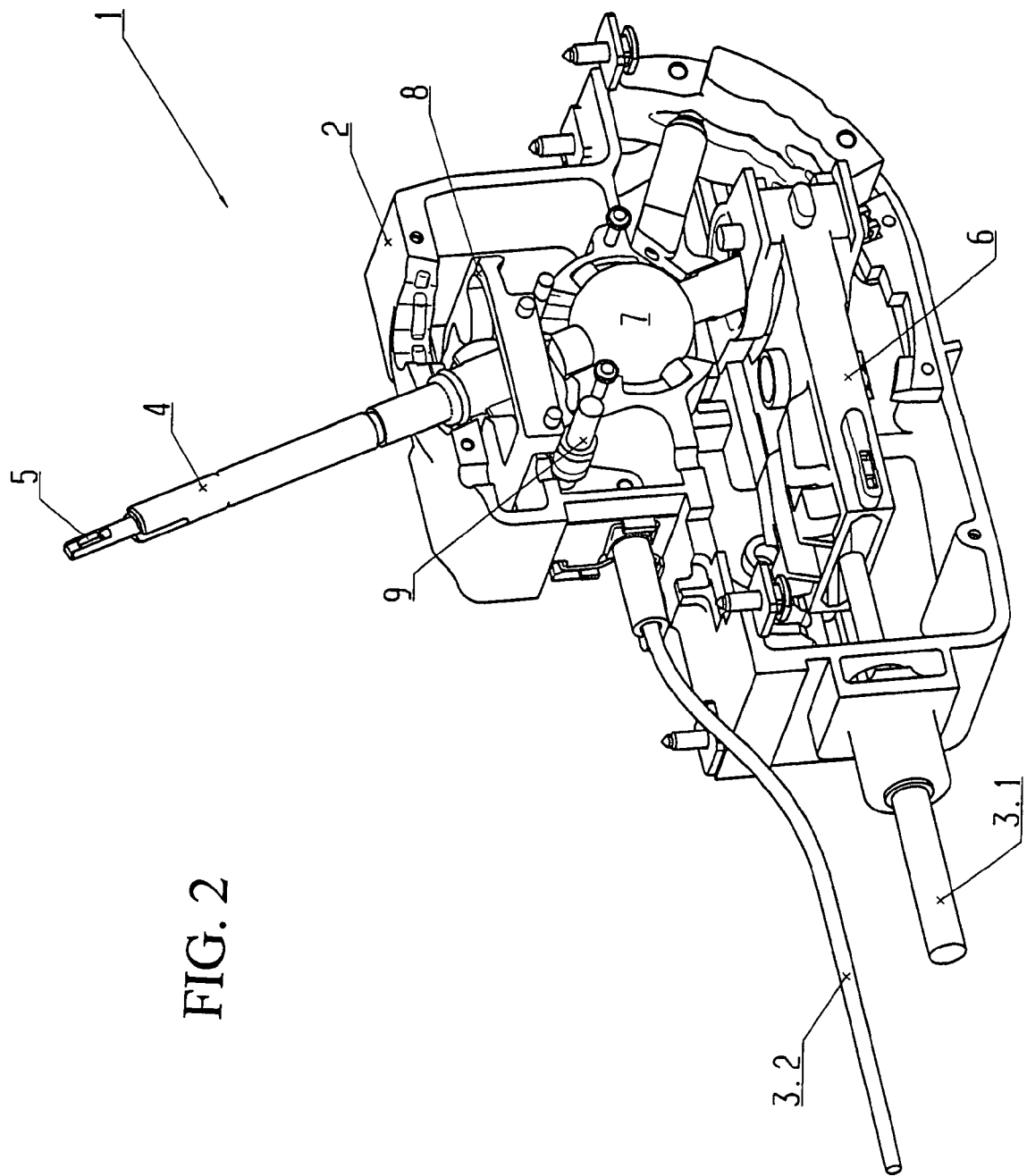
FIG. 2 is a perspective view of the shifting device from FIG. 1 with an opened housing.

FIG. 2 shows the same perspective view of the shifting device 1 from FIG. 1, but, unlike in FIG. 1, a cover of the housing 2 is removed. As a result, the shifting mechanism for shifting the positions (P, N, R and D) of the motor vehicle transmission and the mechanism for blocking the selector lever 4 can be better recognized. The selector lever 4 can be moved by means of a ball-and-socket joint bearing 7 in two shift gates, e.g., in the shift gate for shifting programs (P, N, R and D) and in the shift gate for manual shift commands (Tiptronic).

The shifting mechanism for shifting the positions (P, N, R and D) of the motor vehicle transmission comprises essentially a linearly movable shift carriage 6. This shift carriage 6 is connected to the lower end of the selector lever 4 under the ball-and-socket bearing 7. In addition, the shift carriage 6 is connected to the bowden cable 3.2, as a result of which it is possible to transmit the shift commands from the selector lever 4 to the motor vehicle transmission.

The mechanism for locking the selector lever 4, which is arranged above the ball-and-socket bearing 7, has a stopper 8. This stopper 8 is connected to the selector lever 4. A locking lever 9 can be moved by means of a bowden cable 3.2, which leads to the ignition lock. Depending on the position, this locking lever 9 can make possible the movement of the selector lever 4, on the one hand, and fix the selector lever 4 in the shift position P (Park), on the other hand.

Figure 3:
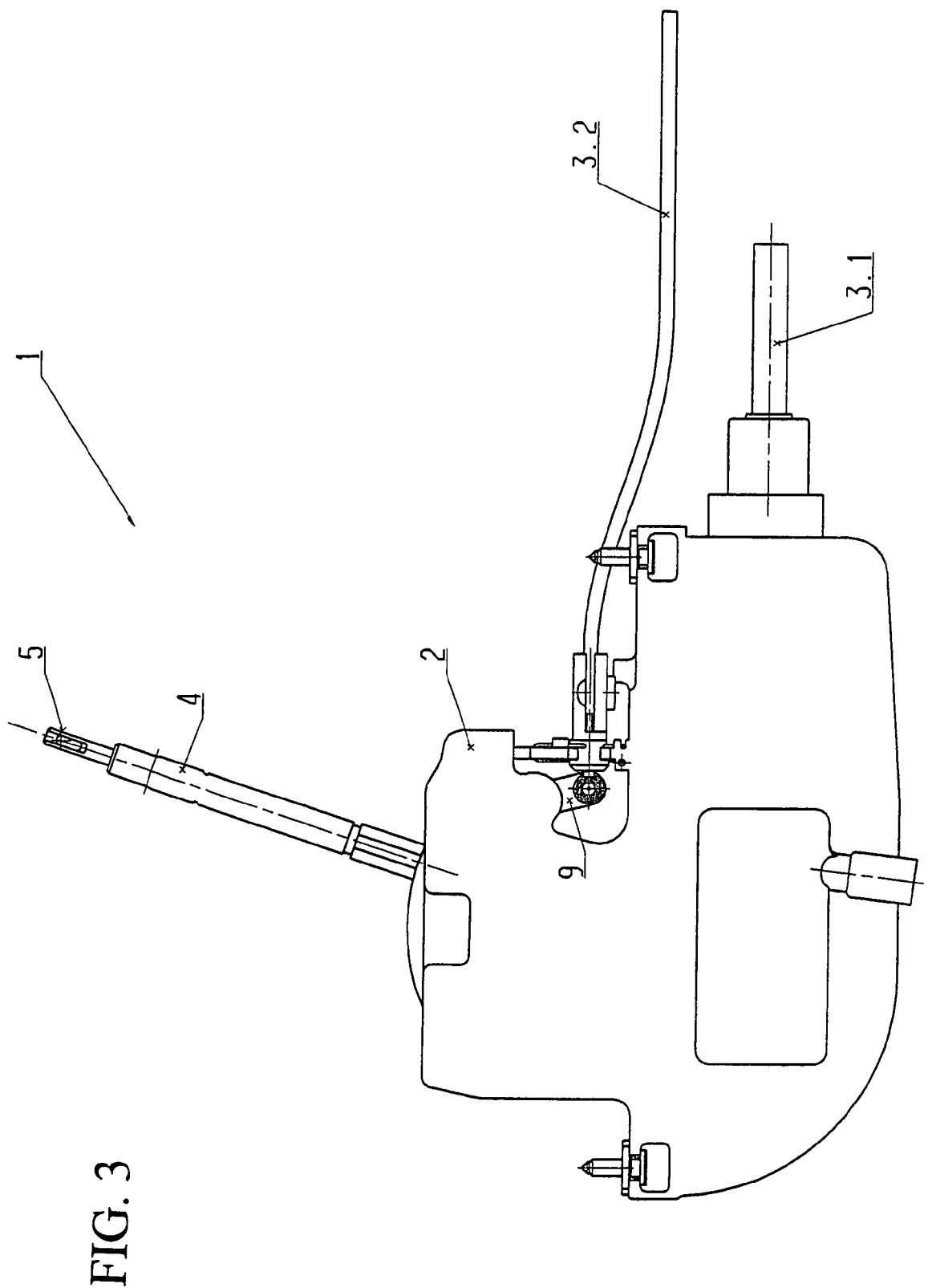
FIG. 3 is a side view of a shifting device with a locking device for the selector lever.

FIG. 3 shows a side view of the shifting device 1 for a motor vehicle transmission with a locking device for the selector lever 4. The fixing of the bowden cable 3.2, which leads to the ignition lock, at the housing 2 of the shifting device 1 can be clearly recognized in FIG. 3.

Figure 4:
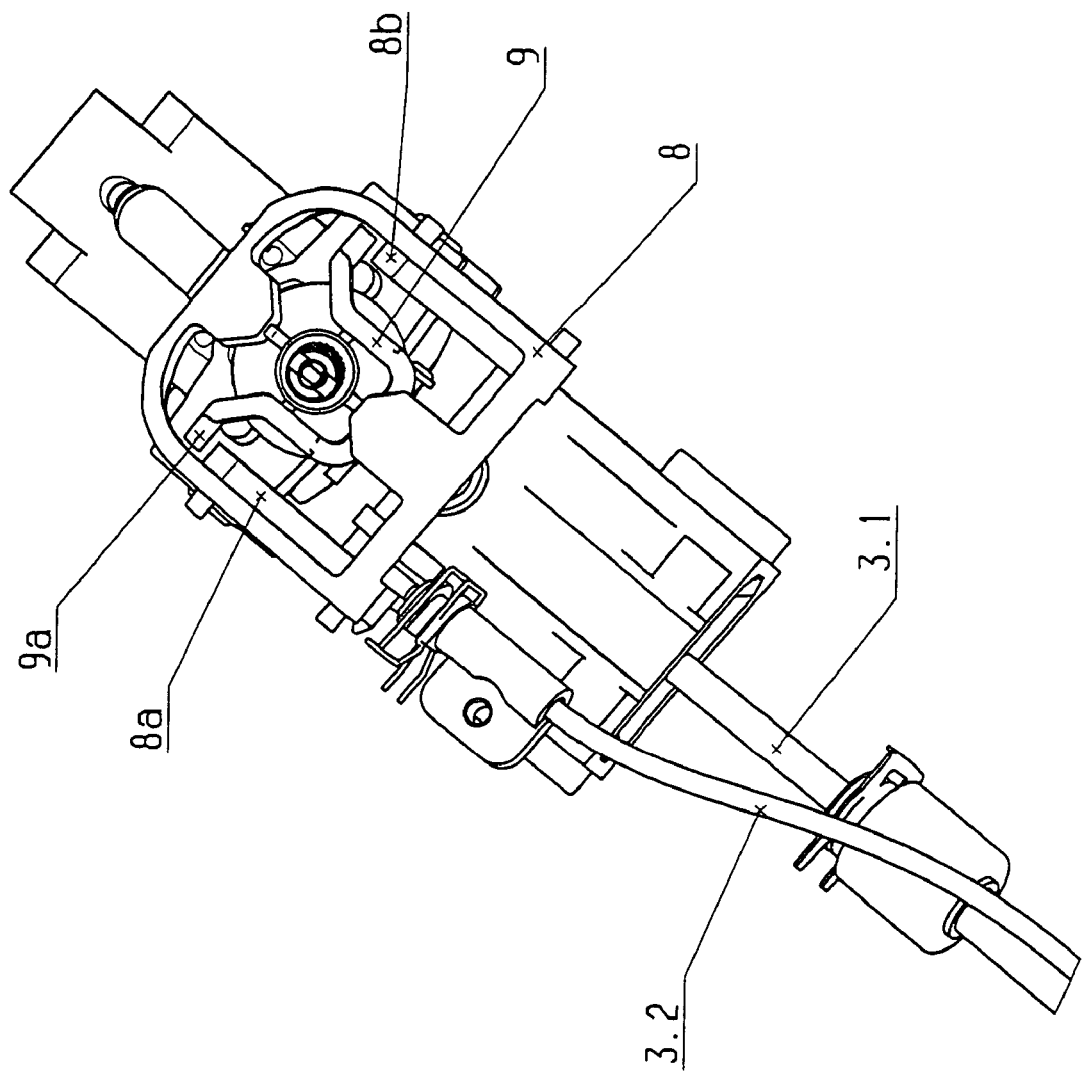
FIG. 4 is a perspective detail view of the locking device in the housing.

FIG. 4 shows a perspective detail view from the top of the locking device in the housing 2 of the shifting device 1. The fork-shaped locking lever 9 can be recognized especially clearly from this position. This locking lever 9 has small extension arms 9a at its two ends. The locking lever 9 is connected to the bowden cable 3.2, which leads to the ignition lock of the motor vehicle. Furthermore, the stopper 8 can also be recognized in this view. This stopper 8 is designed such that it is possible to move the locking lever 9 with the extension arms 9a through the stopper 8 when the locking lever 9 is moved upward (out of the plane of the drawing in FIG. 4). The stopper 8 has two ramps, which guide the extension arms 9a and consequently the locking lever 9 upward. Furthermore, two guideways 8a, which make possible a relative movement between the stopper 8 and the locking lever 9 during the movement of the selector lever 4, are arranged at the stopper 8.

Figure 5:
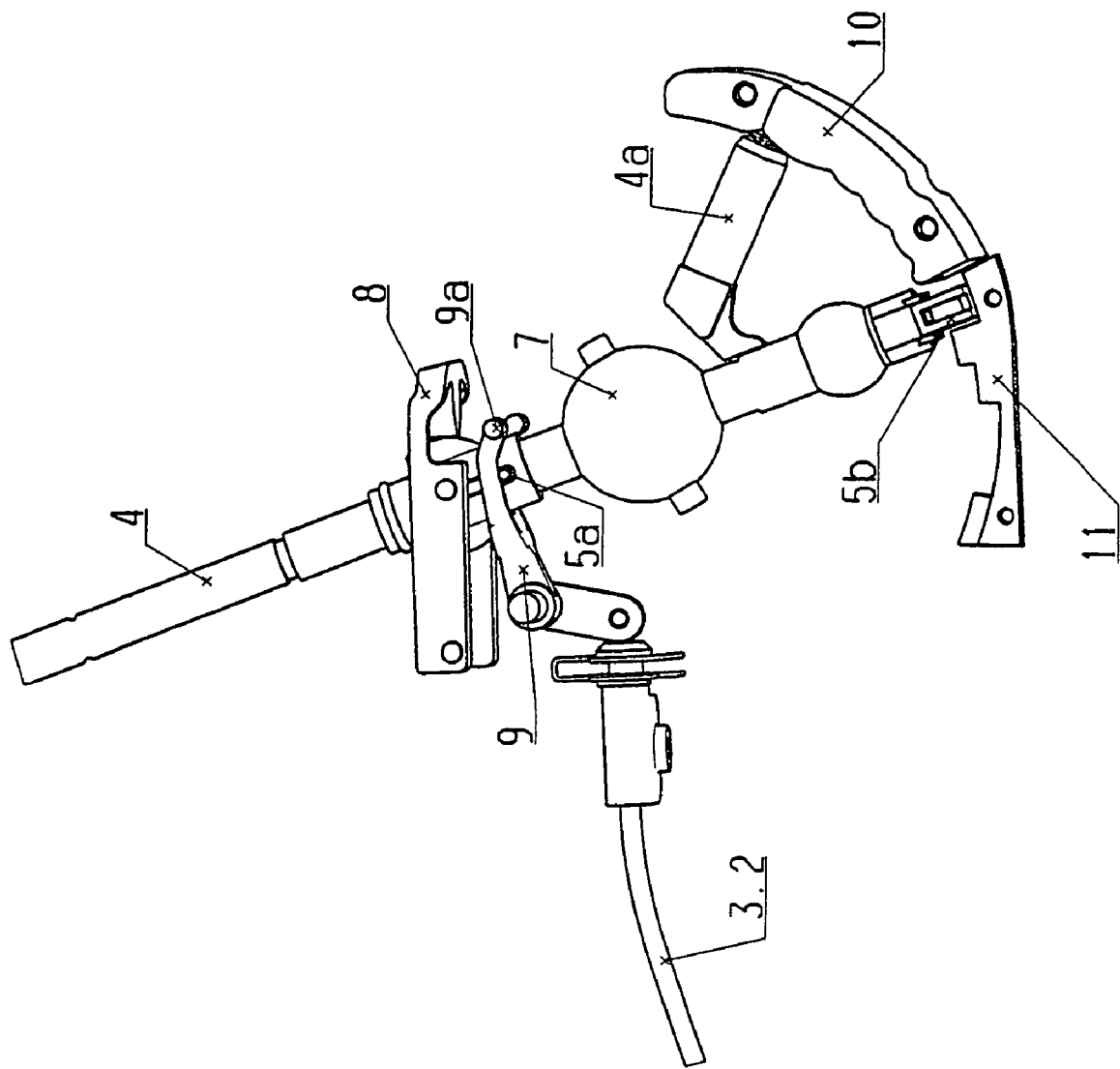
FIG. 5 is a side view of the locking device, in which the selector lever is fixed in position P (Park)

FIG. 5 shows a side view of the locking device, where the selector lever 4 is fixed in position P (Park). To fix the selector lever 4 in this shift position, a locking nose 5b, which is connected to the locking bar 5, engages a locking cam 11 at the lower end of the selector lever 4. The locking bar 5 is not visible in FIG. 5, because the locking bar extends within the selector lever 4. If the ignition key is removed from the ignition of the vehicle in shift position P, the locking lever 9 is held in this position via the bowden cable 3.2. The locking lever 5 "blocks" a pin 5a, which is connected with the locking bar 5 through a hole. As a result, the selector lever 4 cannot be moved out of the shift position P (Park) with the ignition key removed. Due to the locking of the pin 5a, the locking bar 5 cannot be moved, and thus the locking nose 5b at the lower end of the selector lever 4 cannot be released from the locking cam 11, either.

Figure 6:
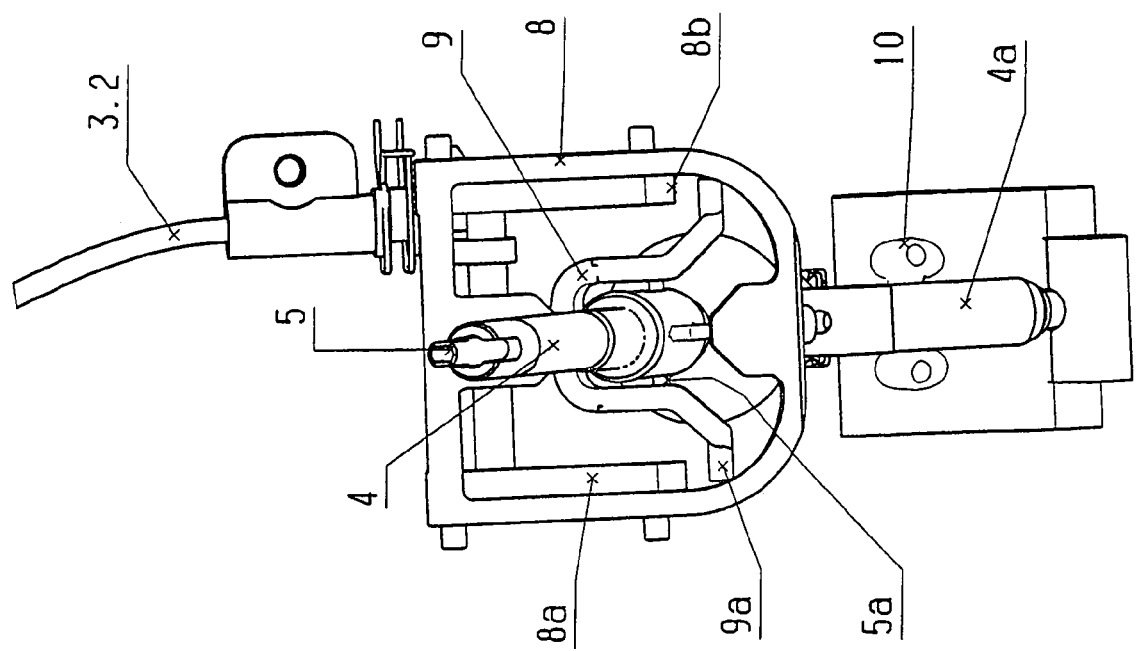
FIG. 6 is the locking device from FIG. 5 in a view from the top end of the selector lever.

FIG. 6 shows the locking device from FIG. 5 as viewed from the top end of the selector lever 4. The selector lever 4 is in shift position P (Park) here. This view shows clearly how the fork-shaped locking lever 9 lies on the pin 5a, which is connected through a hole in the selector lever 4 with the locking bar 5.

Figure 7:
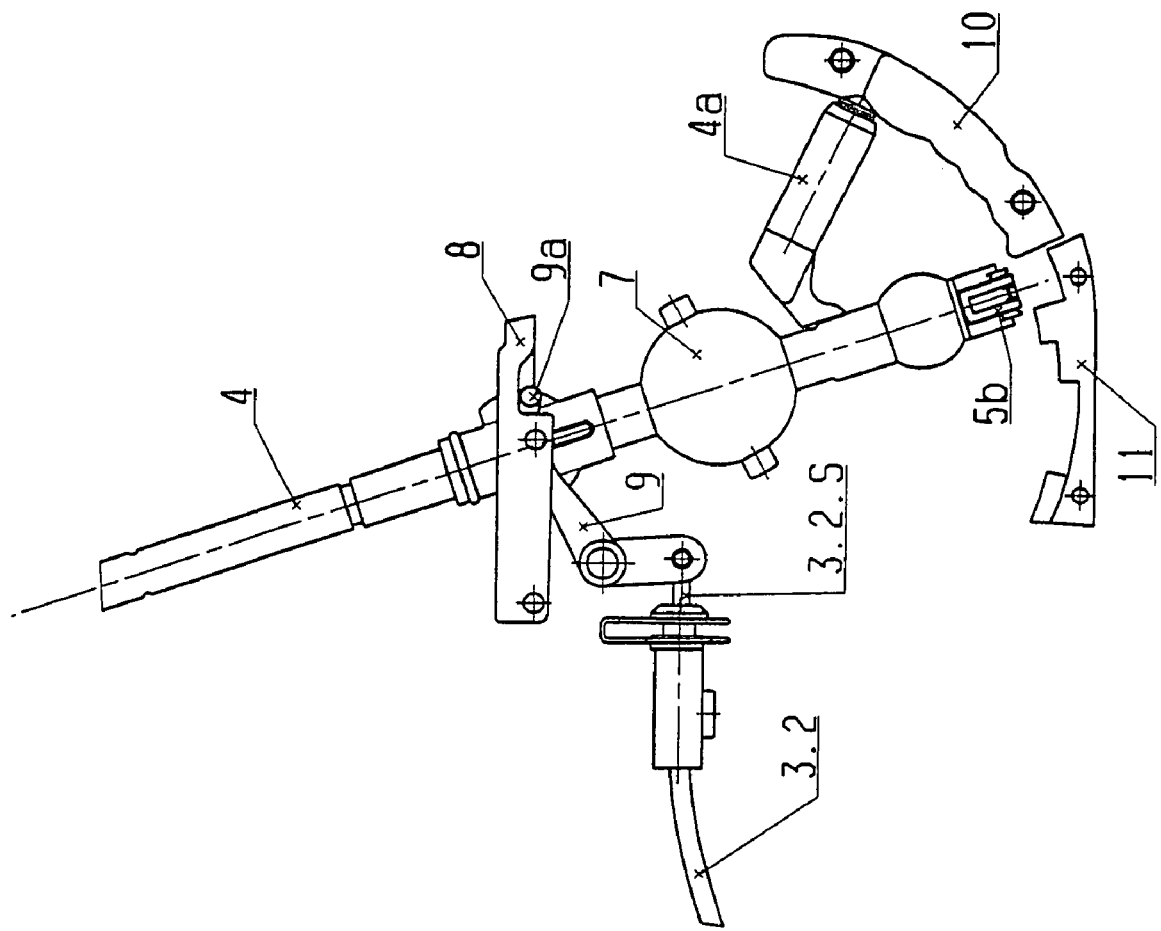
FIG. 7 is a side view of the selector lever and the locking device, in which the selector lever, which is now in the shift position P (Park), is unlocked.

FIG. 7 shows a side view of the selector lever 4 and the locking device, in which the selector lever 4, which is just now in the shift position P, is released. If the ignition key is turned in the ignition lock of the motor vehicle, the locking lever 9 is moved upward via the cable 3.2.S in the bowden cable 3.2. The locking lever 9 no longer lies on the pin through the locking bar now (both are invisible in FIG. 7). As a result, the movement of the locking bar in the interior of the selector lever 4 is released. It can be seen in FIG. 7 that the locking nose 5b at the lower end of the locking bar is pulled out of the locking position of the locking cam 11. The selector lever 4 can now be moved only into another shift position or into the manual shift gate. To make it more comfortable to shift the lever positions, a guide element 4a is provided at the end of the selector lever 4. This guide element 4a engages a guide cam 10 and makes it possible to find the shift positions in a more specific manner.

Figure 8:
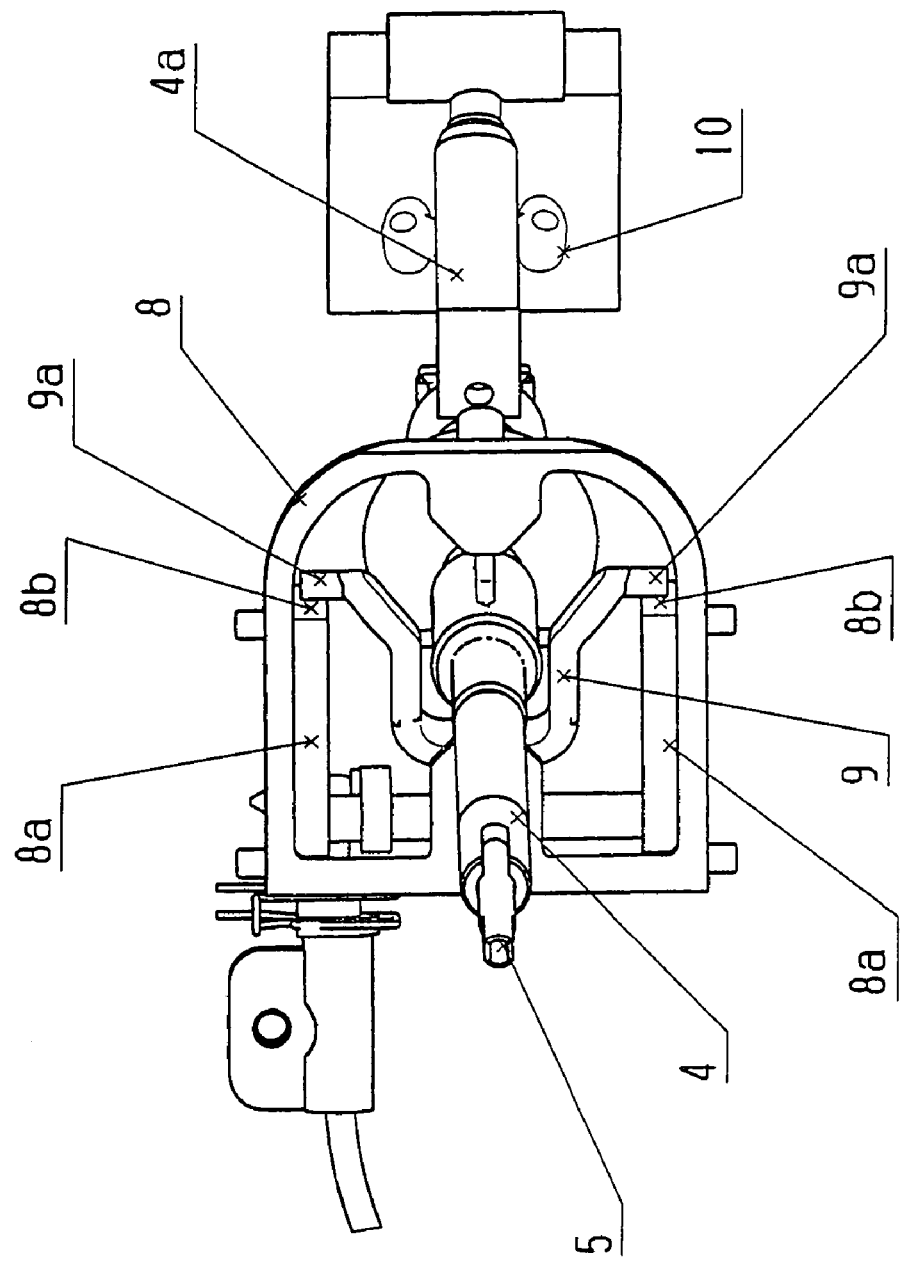
FIG. 8 is the selector lever and the locking device from FIG. 7 in a view from the top end of the selector lever.

FIG. 8 show another view of the selector lever 4 and the locking device from FIG. 7 from the top end of the selector lever 4. The raised locking lever 9 is clearly recognizable. The two extension arms of the locking lever 9a are already in contact with the ramp 8b of the stopper 8. If the selector lever 4 in FIG. 8 is moved to the right, the extension arms of the locking lever 9a slide up along the ramp 8b of the locking carriage 8. If the selector lever 4 is moved farther to the right, the two extension arms of the locking lever 9a are moved along the guideways 8a of the locking carriage 8. The locking carriage 8 with the guideways 8a consequently prevents the locking lever 9 from being pulled by the bowden cable 3.2.S downward during the shifting of the selector lever 4. This means that the ignition key cannot be removed from the ignition lock during the shifting of the selector lever 4.

Figure 9:
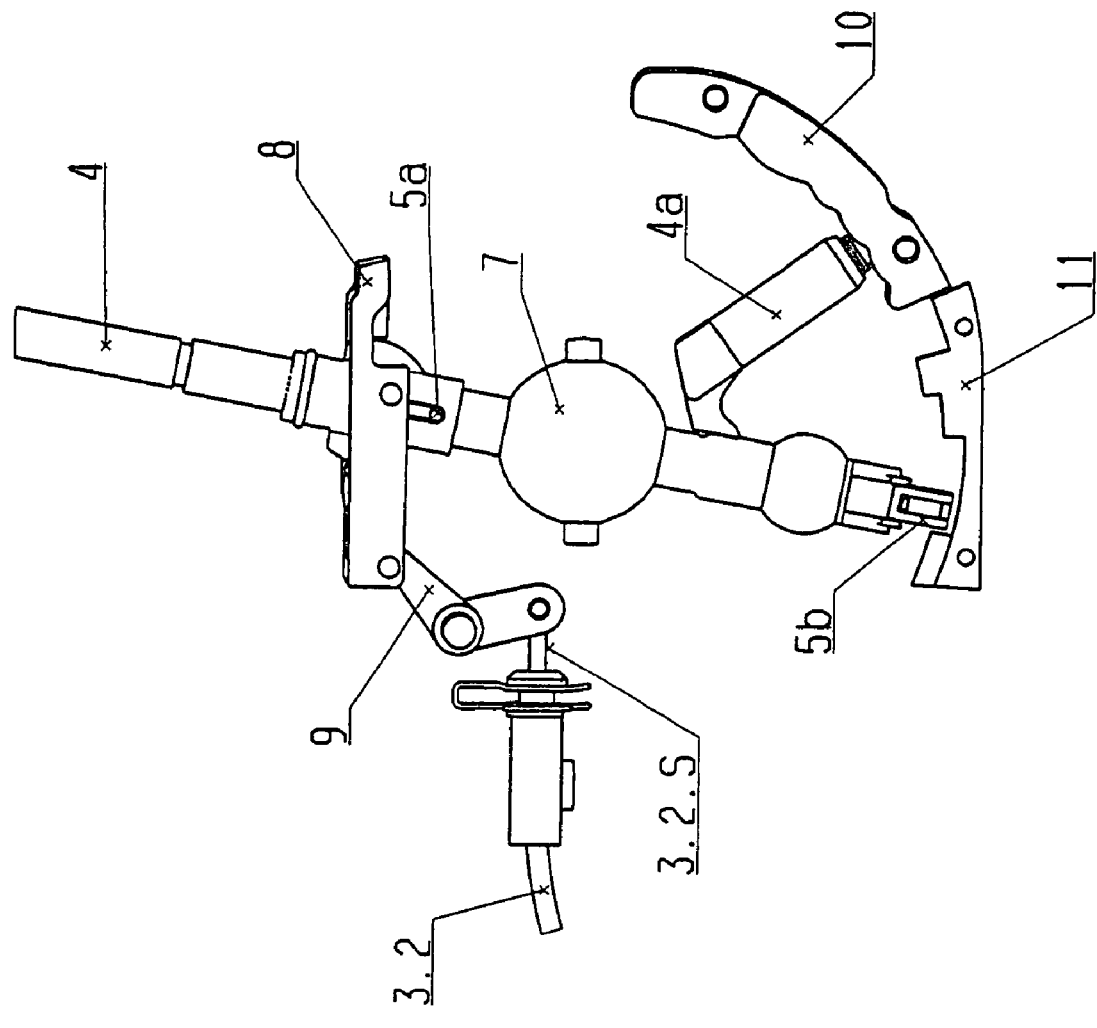
FIG. 9 is a side view of the selector lever and the locking device, in which the selector lever is in the shift position D (Drive) and the locking lever is held on the guideway.

FIG. 9 shows a side view of the selector lever 4 and the locking device, in which the selector lever 4 is in the shift position D (Drive) and the locking lever 9 is held on the guideway. This locked position of the locking lever 9 is held by the locking carriage 8. It is not possible to remove the ignition key in this shift position.

Figure 10:
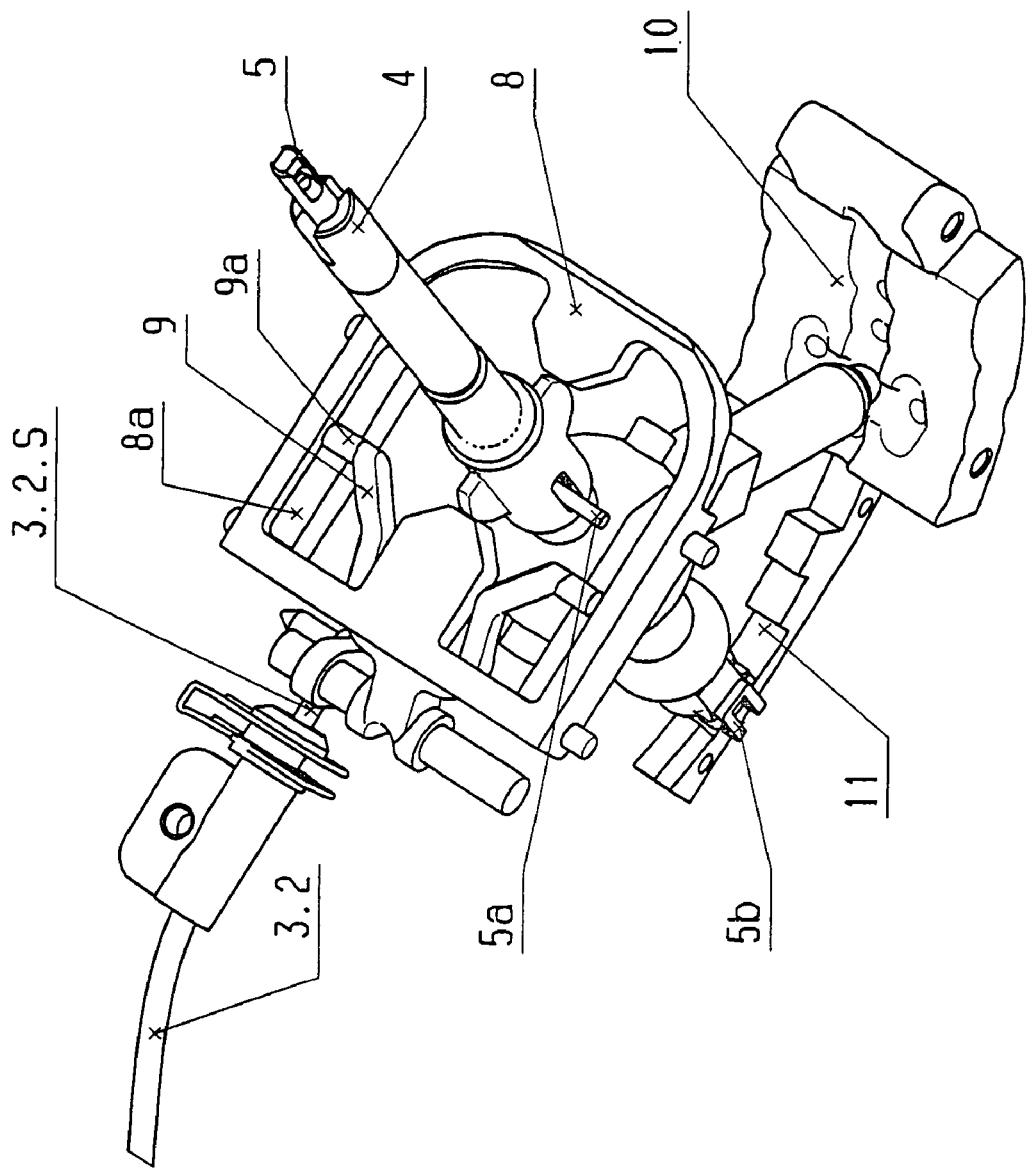
FIG. 10 is a perspective oblique view from the top of the selector lever and the locking device from FIG. 9.

FIG. 10 shows the selector lever 4 and the locking device from FIG. 9 in a perspective view as seen obliquely from the top. The selector lever 4 is just in the shift position D (Drive). The locking lever 9, whose extension arms 9a are held by the guideway 8a of the locking carriage 8, can be recognized in this view especially clearly.

Consequently, the present invention provides, on the whole, a shifting device for an automatic transmission of a motor vehicle with a locking device for the selector lever, in which the locking device requires considerably less space for its installation in the shifting device, the locking of the selector lever functions more reliably, and the shifting comfort of the shifting device is improved at the same time concerning the forces to be exerted by the hand.

It is apparent that the above-described features and the features in the claims can be used not only in the particular combinations described, but in other combinations or alone as well, without going beyond the scope of the present invention. A mechanical reversal of the functions of the individual mechanical elements of the present invention is also within the scope of the present invention. While specific embodiments of the invention have been shown and described in detail to illustrate the application of the principles of the invention, it will be understood that the invention may be embodied otherwise without departing from such principles.

What is claimed is:

1. A shifting device for transmitting shift commands to an automatic transmission of a motor vehicle, the shifting device comprising:
    a device support structure;
    a selector lever for transmitting shift commands to the transmission of the motor vehicle, said selector lever being movable at least in one of an automatic gate and in an automatic gate and an individual gear shift gate;
    an axially displaceable locking bar that can be actuated manually, said selector lever being fixable in a parking position P by said locking bar;
    a locking device coupled with an ignition lock preventing the unlocking of said selector lever from the parking position when the ignition key has been removed and preventing the removal of the ignition key when said selector lever is outside the parking position, said locking device including a stopper displaceable in a direction of said automatic gate and through which direction said selector lever passes, and a locking lever acting on said stopper, wherein a coupling is provided between said locking bar and said locking lever.

2. A shifting device in accordance with claim 1, wherein said stopper and said selector lever have a contour each that couples said stopper with the movement of said selector lever only in said automatic gate.

3. A shifting device in accordance with claim 1, wherein the coupling between said locking bar and said locking lever is formed by a cross pin, said cross pin acting under said locking lever.

4. A shifting device in accordance with claim 1, further comprising guide rails for the linear guiding of said stopper, said guide rails being arranged in said device support structure.

5. A shifting device in accordance with claim 1, wherein said stopper has at least one ramp for at least one extension arm of said locking lever.

6. A shifting device in accordance with claim 5, wherein said extension arm of said locking lever has a roller in the area of contact with said stopper.

7. A shifting device in accordance with claim 1, wherein said stopper has at least one guideway.

8. A shifting device in accordance with claim 1, wherein the coupling between the ignition lock and said locking lever is embodied by a bowden cable.

9. A shifting device for transmitting shift commands to an automatic transmission of a motor vehicle, the shifting device comprising:
    a selector lever for transmitting shift commands to the transmission of the motor vehicle, said selector lever being movable in an automatic gate and a single gear shift gate;
    an axially displaceable locking bar that can be actuated manually, said selector lever being fixable in a parking position P by said locking bar;
    a locking device coupled with a vehicle ignition lock and preventing the unlocking of said selector lever from the parking position when the ignition key has been removed from the ignition lock and preventing the removal of the ignition key from the ignition lock when said selector lever is outside the parking position, said locking device including a stopper displaceable in a direction of said automatic gate and through which direction said selector lever passes, and a locking lever acting on said stopper, wherein a coupling is provided between said locking bar and said locking lever.

10. A shifting device in accordance with claim 9, wherein said stopper and said selector lever have a contour each that couples said stopper with the movement of said selector lever only in said automatic gate and not in said single gear shift gate.

11. A shifting device in accordance with claim 9, wherein the coupling between said locking bar and said locking lever is formed by a cross pin, said cross pin acting under said locking lever.

12. A shifting device in accordance with claim 9, further comprising a device support structure and guide rails for the linear guiding of said stopper, said guide rails being arranged in said device support structure.

13. A shifting device in accordance with claim 9, wherein said stopper has at least one ramp for at least one extension arm of said locking lever.

14. A shifting device in accordance with claim 13, wherein said extension arm of said locking lever has a roller in the area of contact with said stopper.

15. A shifting device in accordance with claim 9, wherein said stopper has at least one guideway.

16. A shifting device in accordance with claim 9, wherein the coupling between the vehicle ignition lock and said locking lever comprises a bowden cable.

17. A shifting device for transmitting shift commands to an automatic transmission of a motor vehicle, the shifting device comprising:
- a selector lever for transmitting shift commands to the transmission of the motor vehicle, said selector lever being movable in an automatic gate;
- an axially displaceable locking bar that can be actuated manually, said selector lever being fixable in a parking position P by said locking bar;
- a locking device coupled with a vehicle ignition lock and preventing the unlocking of said selector lever from the parking position when the ignition key has been removed from the ignition lock and preventing the removal of the ignition key from the vehicle ignition lock when said selector lever is outside the parking position, said locking device including a stopper displaceable in a direction of said automatic gate and through which direction said selector lever passes, and a locking lever acting on said stopper, wherein a coupling independent of said stopper is provided between said locking bar and said locking lever.

18. A shifting device in accordance with claim 17, further comprising an individual gear shift gate for single gear shifting, wherein said stopper and said selector lever have a contour each that couples said stopper with the movement of said selector lever only in said automatic gate and not in said individual gear shift gate.

19. A shifting device in accordance with claim 17, further comprising a device support structure and guide rails for the linear guiding of said stopper, said guide rails being arranged in said device support structure.

20. A shifting device in accordance with claim 17, wherein:
- said stopper has at least one ramp for at least one extension arm of said locking lever
- said extension arm of said locking lever has a roller in the area of contact with said stopper; and
- said stopper has at least one guideway.

21. A shifting device for transmitting shift commands to an automatic transmission of a motor vehicle, the shifting device comprising:
- a selector lever for transmitting shift commands to the transmission of the motor vehicle, said selector lever being movable in an automatic gate;
- an axially displaceable locking bar that can be actuated manually, said selector lever being fixable in a parking position P by said locking bar;
- a locking device coupled with a vehicle ignition lock and preventing the unlocking of said selector lever from the parking position when the ignition key has been removed from the ignition lock and preventing the removal of the ignition key from the vehicle ignition lock when said selector lever is outside the parking position, said locking device including a stopper displaceable in a direction of said automatic gate and through which direction said selector lever passes, and a locking lever acting on said stopper, wherein a coupling is provided between said locking bar and said locking lever and said stopper has contour with a region with a course of movement of said locking lever passing through said region.

22. A shifting device according to claim 21, wherein the contour of said stopper is forked shaped.

23. A shifting device according to claim 22, wherein said forked shaped locking lever comprises tines extending around said selector lever.

24. A shifting device according to claim 22, wherein said locking lever has ends with extension arms;
said stopper has two guideways; and
said extension arms of said locking lever are held by said guideways of said stopper outside of said parking position P.

25. A shifting device according to claim 23, wherein said locking lever has ends with extension arms;
said stopper has two guideways; and
said extension arms of said locking lever are held by said guideways of said stopper outside of said parking position P.

* * * * *